United States Patent
Brachet et al.

(10) Patent No.: US 7,471,954 B2
(45) Date of Patent: Dec. 30, 2008

(54) METHODS AND SYSTEMS FOR ESTIMATING A USER POSITION IN A WLAN POSITIONING SYSTEM BASED ON USER ASSIGNED ACCESS POINT LOCATIONS

(75) Inventors: Nicolas Brachet, Chestnut Hill, MA (US); Farshid Alizadeh-Shabdiz, Wayland, MA (US)

(73) Assignee: Skyhook Wireless, Inc., Boston, MA (US)

( * ) Notice: Subject to any disclaimer, the term of this patent is extended or adjusted under 35 U.S.C. 154(b) by 184 days.

(21) Appl. No.: 11/678,301

(22) Filed: Feb. 23, 2007

(65) Prior Publication Data

US 2007/0202888 A1 Aug. 30, 2007

Related U.S. Application Data

(60) Provisional application No. 60/776,253, filed on Feb. 24, 2006.

(51) Int. Cl.
*H04Q 7/20* (2006.01)
(52) U.S. Cl. .................. 455/456.5; 455/457; 342/450; 707/100
(58) Field of Classification Search .............. 455/456.5, 455/456.6, 457; 342/450; 707/100
See application file for complete search history.

(56) References Cited

U.S. PATENT DOCUMENTS

| 6,272,405 | B1 | 8/2001 | Kubota et al. |
|---|---|---|---|
| 6,678,611 | B2 | 1/2004 | Khavakh et al. |
| 6,888,811 | B2 | 5/2005 | Eaton et al. |
| 6,978,023 | B2 | 12/2005 | Dacosta |
| 7,123,928 | B2 | 10/2006 | Moeglein et al. |
| 7,167,715 | B2 | 1/2007 | Stanforth |
| 7,167,716 | B2 | 1/2007 | Kim et al. |
| 7,271,765 | B2 * | 9/2007 | Stilp et al. .................. 342/457 |
| 7,305,245 | B2 | 12/2007 | Alizadeh-Shabdiz et al. |
| 7,403,762 | B2 | 7/2008 | Morgan et al. |
| 2002/0184331 | A1 * | 12/2002 | Blight et al. ................ 709/217 |
| 2003/0114206 | A1 * | 6/2003 | Timothy et al. ............. 455/575 |

(Continued)

OTHER PUBLICATIONS

U.S. Appl. No. 11/625,450, filed TBD, Alizadeh-Shabdiz.

(Continued)

*Primary Examiner*—Danh C Le
(74) *Attorney, Agent, or Firm*—Wilmer Cutler Pickering Hale & Dorr LLP

(57) ABSTRACT

A method of estimating a location of a WLAN-enabled user-device in a WLAN-based positioning system is provided. The WLAN-enabled device receives signals transmitted by WLAN-enabled access points in range of the WLAN-enabled user-device so that observed WLAN-enabled access points identify themselves. The method includes accessing a master database that associates WLAN-enabled access points with corresponding audited locations as determined by an audit of a relatively large geographic area and obtaining location information for any identified WLAN-enabled access point. The method includes accessing a supplemental database to obtain inferred location information corresponding to any identified WLAN-enabled access point. The supplemental database has a relatively small set of WLAN-enabled access points and corresponding inferred locations. The inferred locations are inferred based on input by a user of the WLAN-based positioning system. The method includes estimating a location of the WLAN-enabled user-device based on the audited location information and the inferred location information.

36 Claims, 8 Drawing Sheets

U.S. PATENT DOCUMENTS

| | | |
|---|---|---|
| 2003/0125045 A1 | 7/2003 | Riley et al. |
| 2003/0225893 A1 | 12/2003 | Roese et al. |
| 2004/0019679 A1 | 1/2004 | E et al. |
| 2004/0039520 A1 | 2/2004 | Khavakh et al. |
| 2004/0087317 A1 | 5/2004 | Caci |
| 2004/0205234 A1 | 10/2004 | Barrack et al. |
| 2005/0020266 A1 | 1/2005 | Backes et al. |
| 2005/0037775 A1 | 2/2005 | Moeglein et al. |
| 2005/0055374 A1* | 3/2005 | Sato ........................ 707/104.1 |
| 2005/0192024 A1 | 9/2005 | Sheynblat |
| 2006/0009235 A1 | 1/2006 | Sheynblat et al. |
| 2006/0078122 A1 | 4/2006 | Dacosta |
| 2006/0095348 A1 | 5/2006 | Jones et al. |
| 2006/0095349 A1 | 5/2006 | Morgan et al. |
| 2006/0106850 A1 | 5/2006 | Morgan et al. |
| 2006/0197704 A1 | 9/2006 | Luzzatto et al. |
| 2006/0200843 A1 | 9/2006 | Morgan et al. |
| 2006/0217131 A1 | 9/2006 | Alizadeh-Shabdiz et al. |
| 2006/0240840 A1 | 10/2006 | Morgan et al. |
| 2006/0270421 A1* | 11/2006 | Phillips et al. .............. 455/457 |
| 2007/0004427 A1 | 1/2007 | Morgan et al. |
| 2007/0004428 A1 | 1/2007 | Morgan et al. |
| 2007/0126635 A1 | 6/2007 | Houri |
| 2007/0150516 A1 | 6/2007 | Morgan et al. |
| 2007/0178911 A1* | 8/2007 | Baumeister et al. ...... 455/456.1 |
| 2007/0184846 A1* | 8/2007 | Horton et al. ............ 455/456.1 |
| 2007/0202888 A1 | 8/2007 | Brachet et al. |
| 2007/0210961 A1* | 9/2007 | Romijn ...................... 342/464 |
| 2007/0232892 A1 | 10/2007 | Hirota |
| 2007/0258408 A1 | 11/2007 | Alizadeh-Shabdiz et al. |
| 2007/0258409 A1 | 11/2007 | Alizadeh-Shabdiz et al. |
| 2007/0258420 A1 | 11/2007 | Alizadeh-Shabdiz et al. |
| 2007/0258421 A1 | 11/2007 | Alizadeh-Shabdiz et al. |
| 2007/0259624 A1 | 11/2007 | Alizadeh-Shabdiz et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008120 A1 | 1/2008 | Alizadeh-Shabdiz |
| 2008/0008121 A1 | 1/2008 | Alizadeh-Shabdiz |
| 2008/0033646 A1 | 2/2008 | Morgan et al. |
| 2008/0045234 A1* | 2/2008 | Reed ........................ 455/456.1 |
| 2008/0132170 A1 | 6/2008 | Alizadeh-Shabdiz et al. |
| 2008/0139217 A1 | 6/2008 | Alizadeh-Shabdiz et al. |
| 2008/0176583 A1 | 7/2008 | Brachet et al. |

OTHER PUBLICATIONS

International Search Report, International Application No. PCT/US07/62721, mailed Nov. 9, 2007. (3 pages).

U.S. Appl. No. 11/625,450, Alizadeh-Shabdiz.

Griswold et al., "ActiveCampus—Sustaining Educational Communities through Mobile Technology." UCSD CSE Technical Report #CS200-0714, 2002.

Hazas, M., et al., "Location-Aware Computing Comes of Age," IEEE, vol. 37, Feb. 2004.

Hellebrandt, M., et al., "Estimating Position and Velocity of Mobile in a Cellular Radio Network," IEEE Transactions on Vehicular Technology, vol. 46, No. 1, Feb. 1997.

International Search Report, International Application No. PCT/US05/39208, mailed Jan. 29, 2008. (3 pages).

Kim, M., et al., "Risks of using AP locations discovered through war driving," IEEE Transactions on Vehicular Technology, vol. 26, No. 1, Feb. 1997.

Kirsner, S., "One more way to find yourself," The Boston Globe, May 23, 2005, Retrieved from www.boston.com.

Krumm, J., et al., "LOCADIO: Inferring Motion and Location from WLAN Signal Strengths," Proc. of Mobiquitous, Aug. 22-26, 2004.

LaMarca, A., et al., "Place Lab: Device Positioning Using Radio Beacons in the Wild," Intel Corporation, 2004.

Muthukrishnan, K., et al., "Towards Smart Surroundings: Enabling Techniques and Technologies for Localization," Lecture Notes in Computer Science, vol. 3479, May 2005.

LaMarca, A., et al., "Self-Mapping in 802.11 Location Systems," Intel Corporation, 2005.

* cited by examiner

We have found multiple addresses that match the address you entered. Please select the one that best represents your current location.

- ● 332 Congress St, Boston, MA 02210
- ○ 332 Congress St, Boston, MI 48009
- ○ 32 Congress St, Boston, MA 02210

[ Submit ]

Figure 3

METHODS AND SYSTEMS FOR ESTIMATING A USER POSITION IN A WLAN POSITIONING SYSTEM BASED ON USER ASSIGNED ACCESS POINT LOCATIONS

CROSS-REFERENCE TO RELATED APPLICATIONS

This application claims the benefit under 35 U.S.C. §119 (e) to the following U.S. Provisional Patent Application, the contents of which are incorporated by reference herein:
U.S. Provisional Patent Application No. 60/776,253, entitled User Correction Model, filed on Feb. 24, 2006.
This application is related to the following U.S. patent applications:
U.S. patent application Ser. No. 11/261,848, entitled Location Beacon Database, filed on Oct. 28, 2005;
U.S. patent application Ser. No. 11/261,898, entitled Server for Updating Location Beacon Database, filed on Oct. 28, 2005;
U.S. patent application Ser. No. 11/261,988, entitled Location-Based Services That Choose Location Algorithms Based On Number of Detected Access Points Within Range of User Device, filed on Oct. 28, 2005;
U.S. patent application Ser. No. 11/261,987, entitled Method and System for Building a Location Beacon Database, filed on Oct. 28, 2005;
U.S. patent application Ser. No. 11/365,540, entitled Encoding and Compression Of A Location Beacon Database, filed on Mar. 1, 2006;
U.S. patent application Ser. No. 11/562,514, entitled Location Toolbar For Internet Search And Communication, filed on Nov. 22, 2006;
U.S. patent application Ser. No. 11/359,154, entitled Continuous Data Optimization Of Moved Access Points In Positioning Systems, filed Feb. 22, 2006;
U.S. patent application Ser. No. 11/359,144, entitled Continuous Data Optimization of New Access Points in Positioning Systems, filed Feb. 22, 2006;
U.S. patent application Ser. No. 11/359,271, entitled Continuous Data Optimization by Filtering and Positioning Systems, filed Feb. 22, 2006;
U.S. patent application Ser. No. 11/430,079, entitled Estimation of Speed and Direction of Travel In A WLAN Positioning System, filed May 8, 2006;
U.S. patent application Ser. No. 11/430,224, entitled Calculation of Quality of WLAN Access Point Characterization For Use in a WLAN Positioning System, filed May 8, 2006;
U.S. patent application Ser. No. 11/430,222, entitled Estimation of Position Using WLAN Access Point Radio Propagation Characteristics in a WLAN Positioning System, filed May 8, 2006;
U.S. patent application Ser. No. 11/429,862, entitled Estimation of Speed of Travel Using the Dynamic Signal Strength Variation of Multiple WLAN Access Points, filed May 8, 2006;
U.S. patent application Ser. No. 11/430,064, entitled Estimation of Speed and Direction of Travel In a WLAN Positioning System Using Multiple Position Estimations, filed May 8, 2006; and
U.S. patent application Ser. No. 11/625,450, entitled System And Method For Estimating Positioning Error Within A WLAN-Based Positioning System, filed Jan. 22, 2007.
This application is related to the following U.S. Provisional Patent Applications:
U.S. Provisional Patent Application No. 60/819,218, entitled Methods And Systems For Using WLAN Positioning Systems In Assisted GPS Systems, filed on Jul. 7, 2006;
U.S. Provisional Patent Application No. 60/830,624, entitled Methods And Systems For Using WLAN Positioning Systems In Assisted GPS Systems, filed on Jul. 13, 2006;
U.S. Provisional Patent Application No. 60/819,182, entitled Use of a Client-Side Receive-Only WLAN Device In a WLAN Positioning System, filed on Jul. 7, 2006; and
U.S. Provisional Patent Application No. 60/821,479, entitled WLAN Positioning System User Location Pulling Mode for Use in Client-Server Systems, filed on Aug. 4, 2006.

BACKGROUND OF THE INVENTION

1. Field of Invention

This invention generally relates to WLAN-based positioning systems and, more specifically, to methods of using user assigned access point locations to estimate a user's position.

2. Description of Related Art

Location-based services are an emerging area of mobile applications that leverages the ability of new devices to determine their current geographic position and report that to a user or to a service. Some examples of these services include local weather, traffic updates, driving directions, child trackers, buddy finders and urban concierge services. Some of these services allow their users to enter their geographic position, as described below.

Plazes.com is a geo-community website that allows users to "tag" locations and attach content, pictures and other media to that location. Users can also "check in" at a location and share that location with their friends. The user can "check in" using various different methods. The first method solicits the user's current address via a website. The system geocodes this address into a latitude and longitude and records the user as being "checked in" at that location.

The second method uses client-side software that attempts to auto-locate the user using a database of local network MAC addresses; each MAC address is associated with a latitude and longitude. Thus, the system uses the MAC address of the router to which the user is connected in order to determine the corresponding latitude and longitude. If the system doe not find the MAC address in the database, it prompts the user to enter a street address. The user-entered street address gets geocoded and the latitude and longitude submitted is associated with the MAC address and both are added to the database. If the system does recognize the MAC address of the router to which the user is connected, the system returns the stored latitude and longitude and automatically "checks in" the user at that location.

AOL.com uses a database of user-contributed information to help determine the position of a user using a location plug-in for the AOL Instant Messenger application. The system contains a database of network IP addresses and associated locations that have been contributed by users of the system. When a user requests his or her location, the system queries the database for any location entries corresponding to the user's network IP address and returns all of the results to the user with a "use count" next to each unique location entry. If multiple results are found, the system prompts the user to choose which address they would like to use as their location or allows the user to enter his or her own location information. If the network IP address is not found, the system prompts the user to enter his or her current location by entering a street address. This address gets geocoded and sent to the server along with the street address and network IP address to be stored in the database. Thus, other database entries are not overridden, rather, the existing remain and the new entries are added.

Meetro is a location-based instant messaging platform that includes client-side software that enables a user to find other nearby users. Because the system is proximity-based, the accuracy of the location estimation is low relative to other map-based applications. If the system is unable to auto-locate the user, the system allows the user to enter his or her current location as a street address.

BRIEF SUMMARY OF THE INVENTION

The invention provides methods of estimating a user position in a WLAN positioning system based on user assigned access point locations.

Under one aspect of the invention, a method of estimating a geographic location of a WLAN-enabled user-device in a WLAN-based positioning system having a plurality of WLAN-enabled access points comprises the WLAN-enabled device receiving signals transmitted by WLAN-enabled access points in range of the WLAN-enabled user-device so that observed WLAN-enabled access points identify themselves. The method also includes (1) accessing a master database that associates WLAN-enabled access points with corresponding geographic locations for the WLAN-enabled access points as determined by an audit of a relatively large geographic area and obtaining geographic location information for any identified WLAN-enabled access point in range of the WLAN-enabled user-device, (2) accessing a supplemental database to obtain inferred geographic location information corresponding to any identified WLAN-enabled access point in range of the WLAN-enabled user-device, the supplemental database having a relatively small set of WLAN-enabled access points and corresponding inferred geographic locations, the inferred geographic locations being inferred based on input by a user of the WLAN-based positioning system, and (3) estimating a geographic location of the WLAN-enabled user-device based on the geographic location information obtained from the master database and the inferred geographic location information obtained from the supplemental database.

Under another aspect of the invention, the supplemental database includes a subset of WLAN-enabled access points of the master database and corresponding inferred geographic locations based on inferring the geographic locations of the WLAN-enabled access points of the subset are incorrect in the master database. In addition, the supplemental database can include WLAN-enabled access points that were not discovered by the audit of the relatively large geographic area.

Under another aspect of the invention, at least one geographic location from the master database and at least one inferred geographic location are for the same WLAN-enabled access point. In this case, the inferred geographic location is used in place of the geographic location from the master database when estimating the geographic location of the WLAN-enabled user-device.

Under another aspect of the invention, the inferred geographic location information used to estimate the geographic location of the WLAN-enabled user-device is inferred based on input by a single selected user of the WLAN-based positioning system. In addition, the inferred geographic location can be based on input from more than one user of the WLAN-based positioning system. The inferred geographic location can also be supplied by any user of the WLAN-based positioning system. The inferred geographic location can be a current location of the WLAN-enabled user-device. The user can supply a street address and/or a latitude and longitude.

Under another aspect of the invention, the master database and/or the supplemental database reside on the WLAN-enabled user-device. In addition, the master database and/or the supplemental database can reside on a server remote from the WLAN-enabled user-device.

Under another aspect of the invention, a WLAN-enabled access point and its inferred geographic location are included in the supplemental database if the difference between the user-supplied geographic location and the geographic location in the master database associated with the WLAN-enabled access point is greater than a threshold distance. This threshold distance can be based on the average signal propagation distance of more than one WLAN-enabled access points of the WLAN-based positioning system, for example, about 300 meters.

Under another aspect of the invention, the method of estimating a geographic location of a WLAN-enabled user-device can include estimating a street address corresponding to the estimated geographic location of the WLAN-enabled user-device. The street address can be based on a user-supplied street address having a distance from the estimated geographic location of the WLAN-enabled user-device that is less than a threshold distance, for example, about 30 meters.

Under another aspect of the invention, a system for estimating a geographic location of a WLAN-enabled user-device in a WLAN-based positioning system having a plurality of WLAN-enabled access points includes a WLAN-enabled device for receiving signals transmitted by WLAN-enabled access points in range of the WLAN-enabled user-device so that observed WLAN-enabled access points identify themselves and logic to perform the techniques described above.

These and other features will become readily apparent from the following detailed description wherein embodiments of the invention are shown and described by way of illustration.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which:

FIG. 3 illustrates an address selection interface.

DETAILED DESCRIPTION OF THE INVENTION

Embodiments of the present invention allow a user to "tune" the WLAN positioning system to improve the accuracy and coverage of the system. When a user tunes their position as estimated by the system, the system will use environmental variables (e.g., MAC addresses and received signal strengths of access points found by the mobile device and the mobile device IP address) to correct the location database, thereby creating a third tier dataset. As described in further detail below, the system will use this new third tier dataset in conjunction with first and second tier datasets to locate a user when the user is outside a coverage area or when the user is in a coverage area but is not being properly located.

The embodiments of the invention described below may be used with the Wi-Fi based location services and methods described in the related applications listed above, which are herein incorporated by reference. Those applications taught specific ways to gather high quality location data for Wi-Fi access points so that such data may be used to estimate the geographic position, speed, and bearing of a Wi-Fi-enabled device utilizing such services and techniques of increasing the accuracy of the various estimations. However, the platforms described in those applications are not necessary to practice the following invention. Thus, the embodiments described below can be used with other location services platforms and/or methods. Generally, as described in greater detail in the incorporated applications, in the WLAN positioning system, the user's WLAN-enabled mobile device scans for WLAN access points in range of the mobile device. The mobile device records information about the access points in range (e.g., the access points' MAC addresses and received signal strengths) and queries a central database to receive the access points' geographic positions. Using the gathered information and the access point positions, the WLAN positioning system estimates the user's geographic position. The WLAN positioning system can be implemented on a client-server based architecture, in which the central database resides on a server and there is a need for a connection to the server to determine a client's position. In addition, the positioning system can be implemented on a client device with no server interaction, in which case, the various databases, tables and algorithms are located on the Wi-Fi enabled device.

Figure 1:
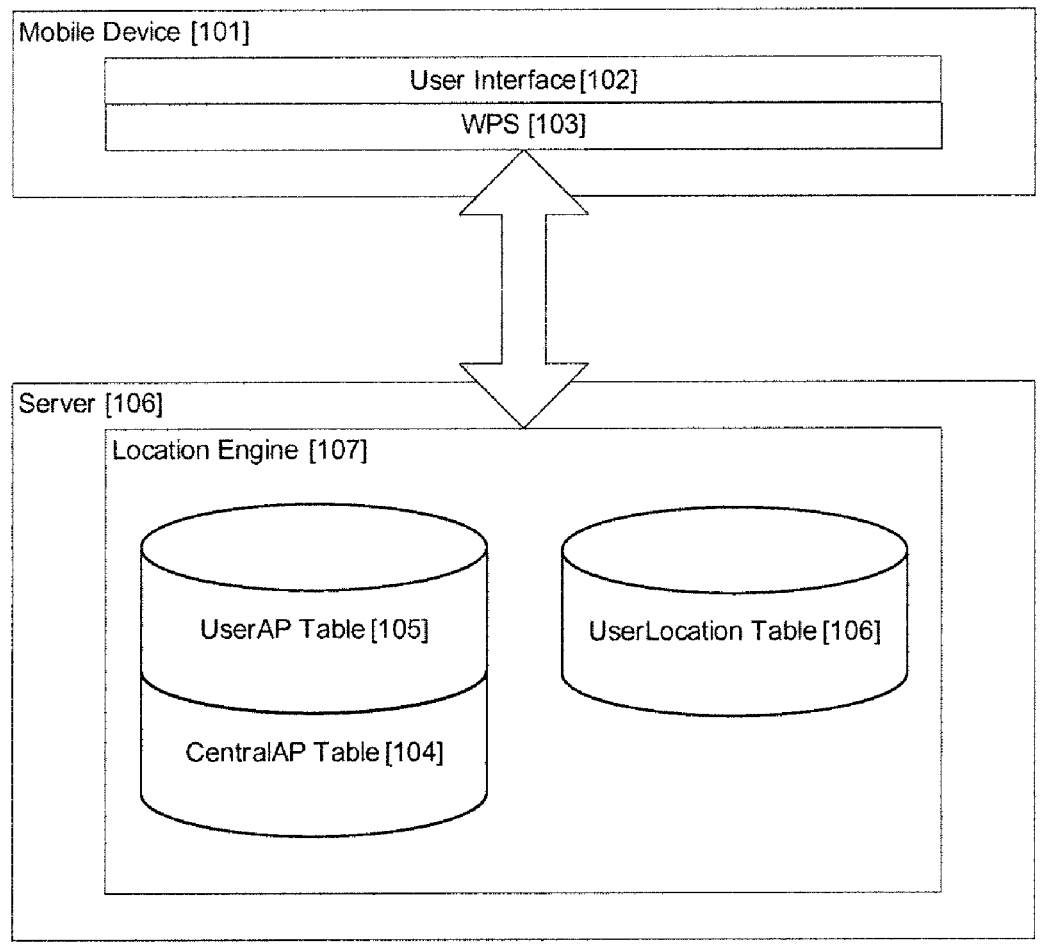
FIG. 1 illustrates a high-level architecture of a WLAN positioning system utilizing user-tuned access point location data.

As depicted in FIG. 1, an embodiment of the system is built on a client-server architecture. The client, or mobile device [101], handles the display of a user interface [102] and houses the client-side of the WLAN positioning system [103] ("WPS"). Mobile device [101] cooperates with a server [106] to estimate a geographic position of the user. When a user elects to tune his or her location, a request is sent to server [106]. The location engine [107] receives the tuning request and stores the new user-tuned access point information in a table (herein "UserAP table") [105] based on a set of rules, which are further described below. Also included on server [106] is a common access point information table that is used by many users of the system (herein "CentralAP table") [104]. As mentioned above, this client-server architecture is only one illustrative design of the system. It is also possible to implement this process on a client device with no server interaction, in which case, the various databases, tables, and algorithms are located on mobile device [101].

The user accesses the tuning capability through an application running on mobile device [101]. For example, a button may be provided on a toolbar of user interface [102] or an application running on mobile device [101] (e.g., a web browser).

Figure 2:
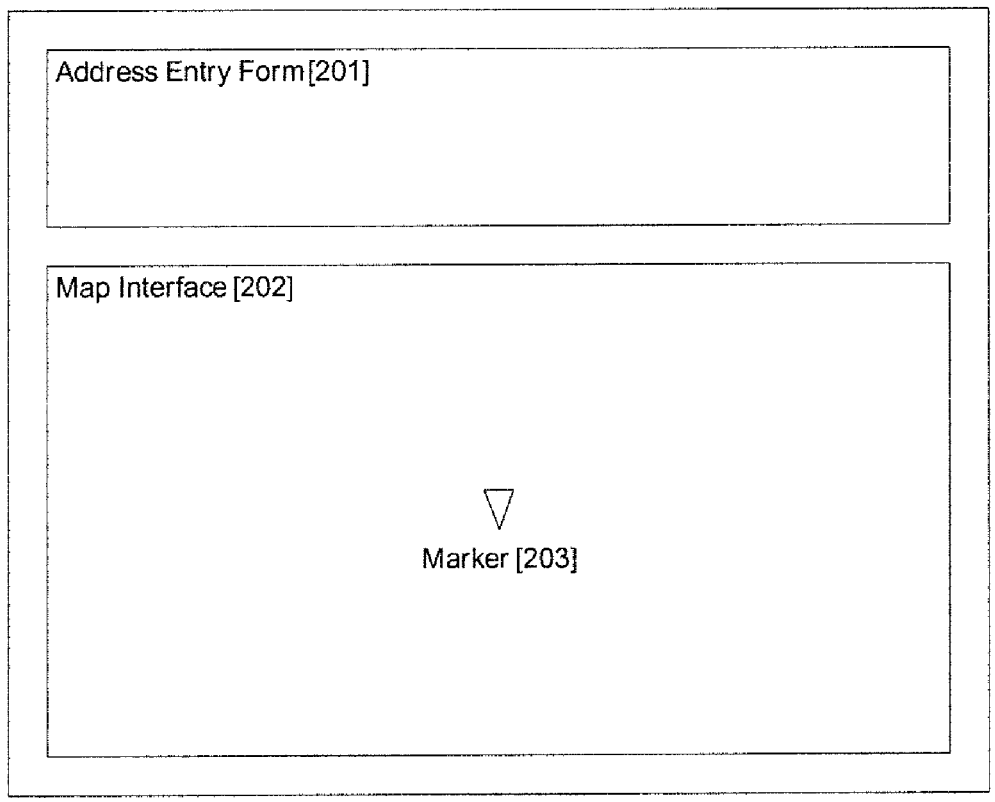
FIG. 2 illustrates a location tuning user interface.

In the illustrative embodiment, when the user accesses the tuning capability on the client system, the user is presented with a screen, which is HTML, sent from the server, an example of which is provided in FIG. 2. Since the screen is HTML, the system can pop-up a new browser window, with no menus or buttons and call a URL. The call can be an HTTP POST using SSL including an ID unique to the user. This enables the server to insert the user's unique ID into a form on the new window so that the ID can be sent back with the address correction data supplied by the user. The system inserts the list of MAC addresses and received signal strengths from the access points in range of the mobile device.

Figure 4:
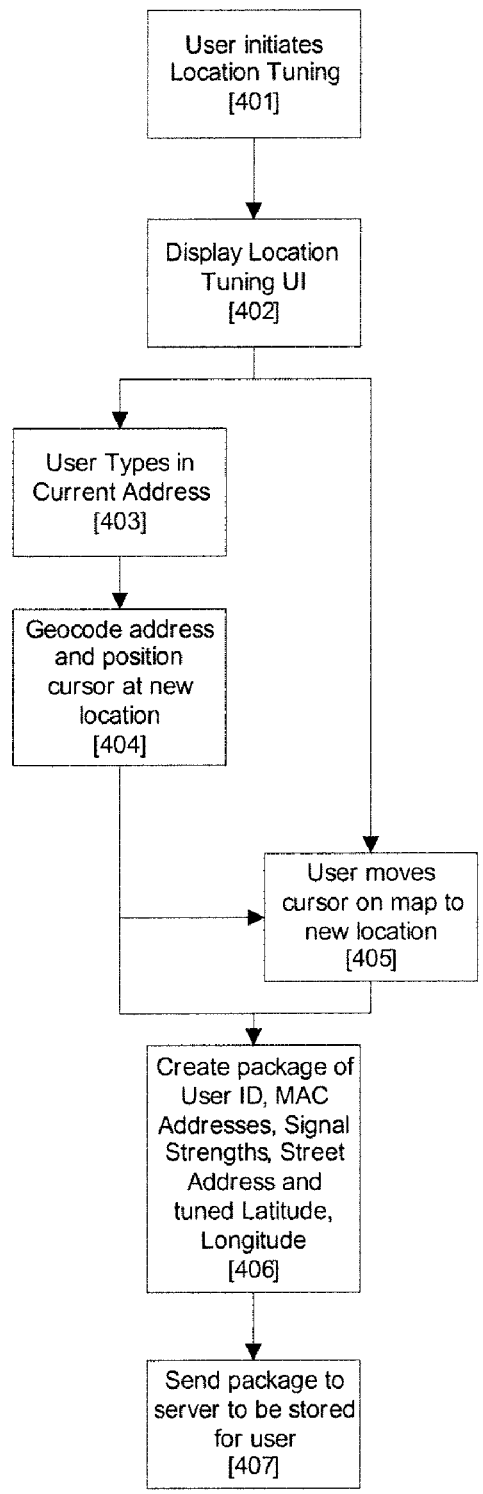
FIG. 4 illustrates a process by which user-tuned location information is submitted to a central location system server.

FIG. 2 depicts an illustrative user interface of the location tuning page, which is composed of a data entry form [201], an HTML form for example, and an embedded map [202]. The user is able to tune his or her location via two different methods, as depicted in FIG. 4. The first method is through the entry of a street address that, through a geocoding process described in further detail below, gets resolved to a single latitude and longitude. The second method is through a map-based interface that allows the user to drag a marker [203] on the embedded map [202] to their location or click the exact location, which is converted to a single latitude and longitude. In both methods, the user initiates location tuning (step 401), and the mobile device responds by displaying the location tuning user interface shown in FIG. 2 (step 402).

In the first method, the user enters a street address into address form [201] and presses a button to initiate the geocoding of the address (step 403). Geocoding is the process of assigning geographic identifiers to map features, for example, street addresses. Thus, when the address is sent to the server, the server attempts to convert the address into a single location by matching address information with geographic locations (i.e., latitude and longitude). However, in some cases, the server cannot resolve the street address to a single location, as when multiple locations exist having the same street address. In such a case, a list of possible addressees is sent back to the client so the user can select the closest address match, as depicted in FIG. 3. Once the location is resolved, marker [203] and map [202] are repositioned to display the new location (step 404). If the user feels their location is correct in the interface, they can submit the "tuned" information to the server by clicking the final submit button. In response to clicking the final submit button, the mobile device creates a package containing the user ID, the MAC addresses the access points in range, the signal strengths of the access points, the tuned street address, and the tuned latitude and longitude (step 406) and sends the package to the server (step 407).

In the second method, the user can drag the marker [203] to his or her corresponding location on map [202] or they can click on the location they would like to position the marker (step 405). This method is useful in the case where the user is not sure of their address or if the geocoding system cannot resolve the user's location correctly. This method can also be used in the case where the user is in a location that a street address would not properly or accurately resolve. A good example of this is either a school or corporate campus where a single address can be used to represent a large section of land. Once marker [205] is properly positioned, the embedded mapping system returns the corresponding latitude and longitude to be sent in a package to the server, as described in steps 406 and 407 above. The first and second methods can be used in combination, hence, the system can display the user's location on map [202] in response to the user entering a street address, and the user can then modify the location by relocating marker [203].

Figure 5:
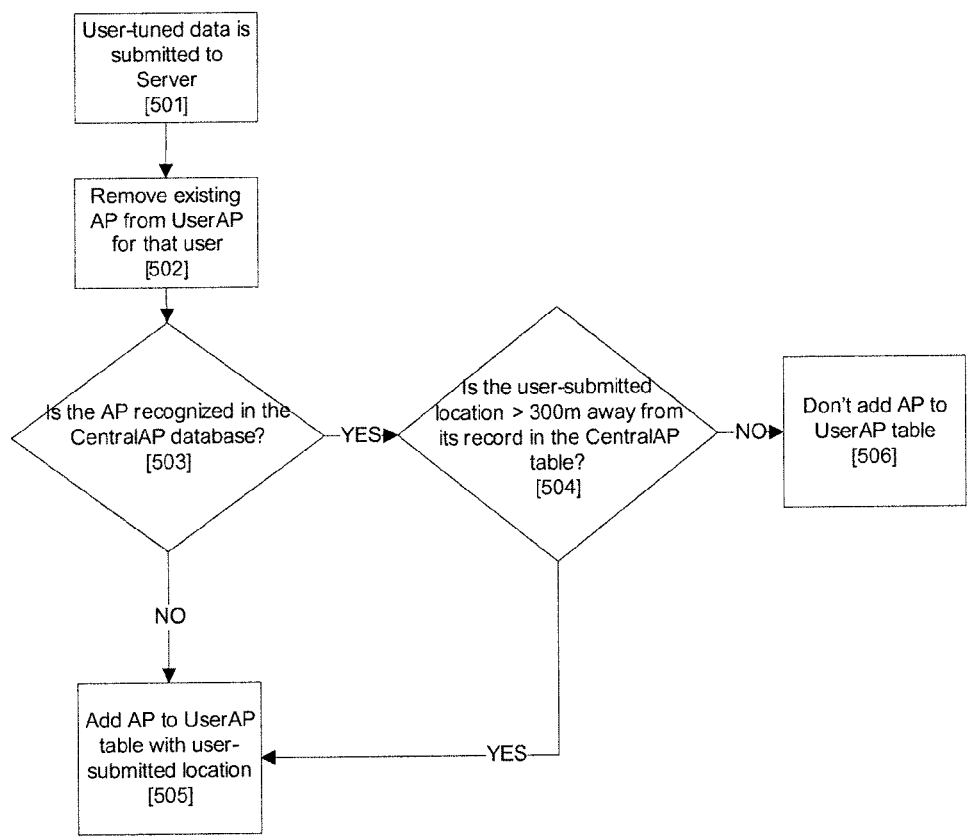
FIG. 5 illustrates a process by which user-tuned data is stored in the system.

FIG. 5 illustrates how the location tuning request is processed by the system. First, the location tuning request is sent to the server [501] and all records in the UserAP table that match the submitted access points for that user are removed from the table (step 502). The server then queries the CentralAP table for each of the submitted MAC addresses [503]. If the access point is not found in the CentralAP table, it is added to the UserAP table along with the new user-submitted location [505]. If the MAC address is found in the CentralAP table, the system compares the location of the access point in the CentralAP table to the location submitted by the user [504]. If the new location is greater than a threshold distance away from its corresponding location in the CentralAP table, the system treats the access point as having moved and adds the access point and its new location to the UserAP table [505]. If the new location is less than the threshold distance, the system treats the access point as having not moved and does not add the access point or new location of the UserAP table [506]. The system performs this process for each access point reported by the user. Not storing the new location in the UserAP table for access points inside the threshold distance essentially reflects the fact that the access point has not likely moved, and the systematically gathered data in the CentralAP table is likely more reliable than user-submitted data. The threshold distance is determined by considering the average signal propagation distance of the access points in the system. For example, 300 meters is a suitable threshold distance.

Figure 6:
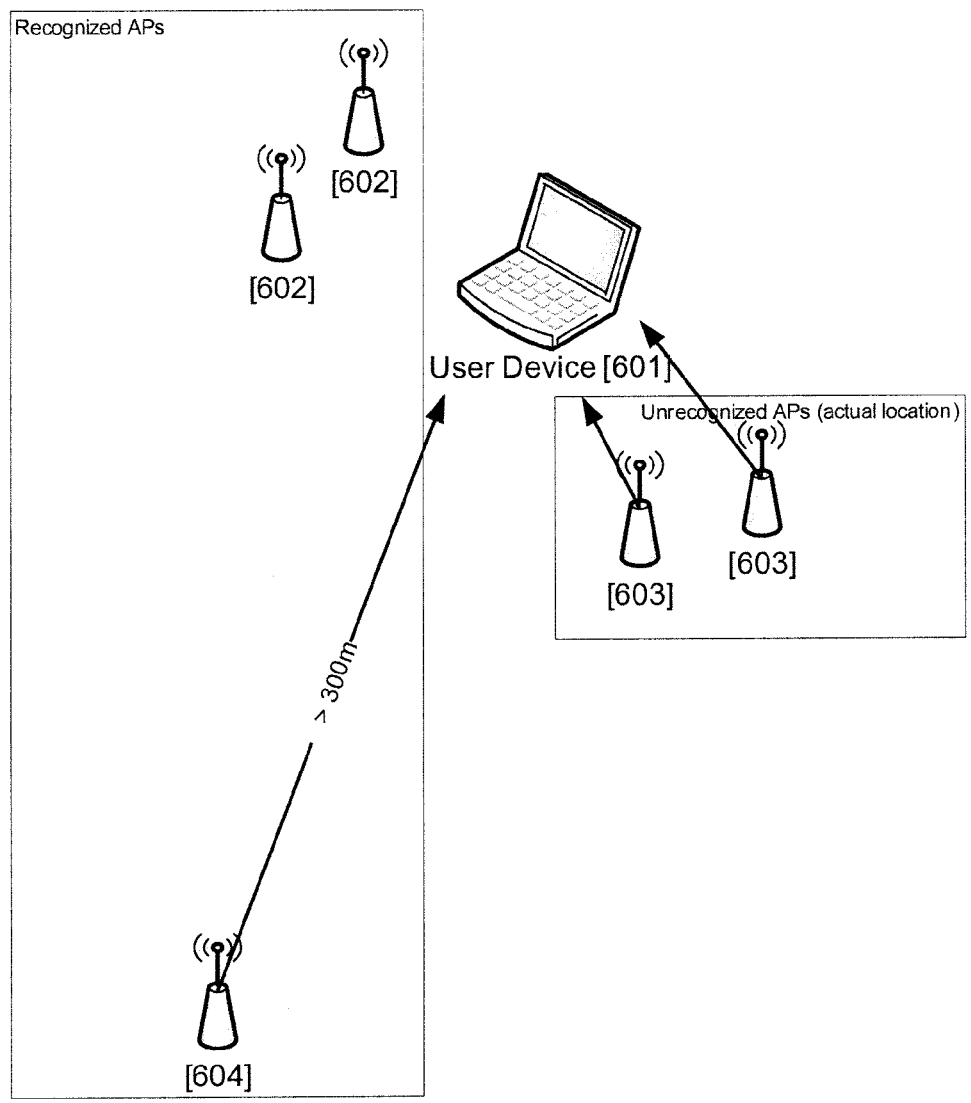
FIG. 6 illustrates how the user-submitted location data affects the recorded position of access points as recorded in the system.
Figure 7:
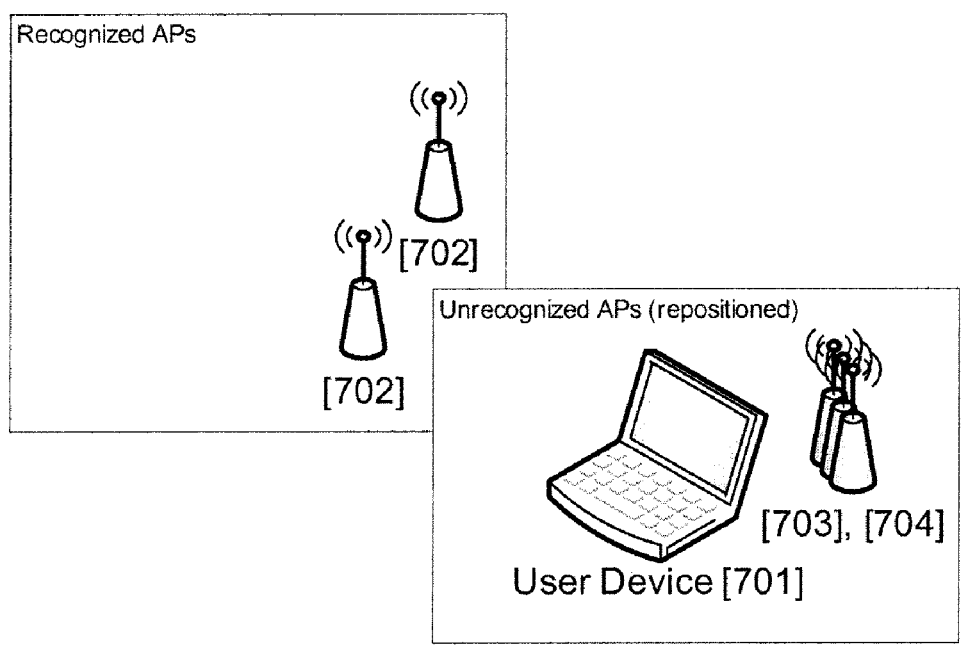
FIG. 7 illustrates how the user-submitted location data affects the recorded position of access points as recorded in the system.

FIG. 6 illustrates how the locations are stored in the UserAP table. FIG. 7 shows how the access point locations are used during a location request. There are three possible scenarios of how access points are handled by the system during a user-tuning request based on whether the access point exists in the CentralAP table and, if so, the distance between the new location and the location in the CentralAP table. The first scenario [602] applies to access points that are in the CentralAP table and the difference between the user-tuned location and the location stored in the CentralAP table is less than the threshold distance. In this scenario, the access points are not added to the UserAP table during the request and the location in CentralAP is used during a later location request [702].

The second scenario applies to access points that are not in the CentralAP table [603]. Each of these access points are added to the UserAP table along with the user-submitted location, represented by mobile device [601], and other user-submitted information. The user-submitted locations are used for the corresponding access points during a later location request [703].

The third scenario applies to access points that are recognized in the CentralAP table, but the location in the CentralAP table is greater than the threshold distance from the user-submitted location [604]. The system treats this access point as having been moved from its previously logged location, and consequently, it is added to the UserAP table along with the user-submitted location [601]. During a later location request involving this access point, the data in the UserAP table will override any information in the CentralAP table. Thus this access point's user-submitted position will be used during any subsequent location requests by the same user.

In other words, the system overlays the newly submitted access point location in the UserAP table over the access point locations in the CentralAP table and treats the new access point locations like a first tier access point location when processing location requests for the same user. This override feature happens immediately upon entry of the user corrected location; the system does not confirm the validity of the corrected location. However, this override only occurs for the unique user associated with the stored information. Overriding the normal location determination only for the unique user prevents a single user from changing, and possibly corrupting, the location system's master database (i.e., the CentralAP table).

Figure 8:
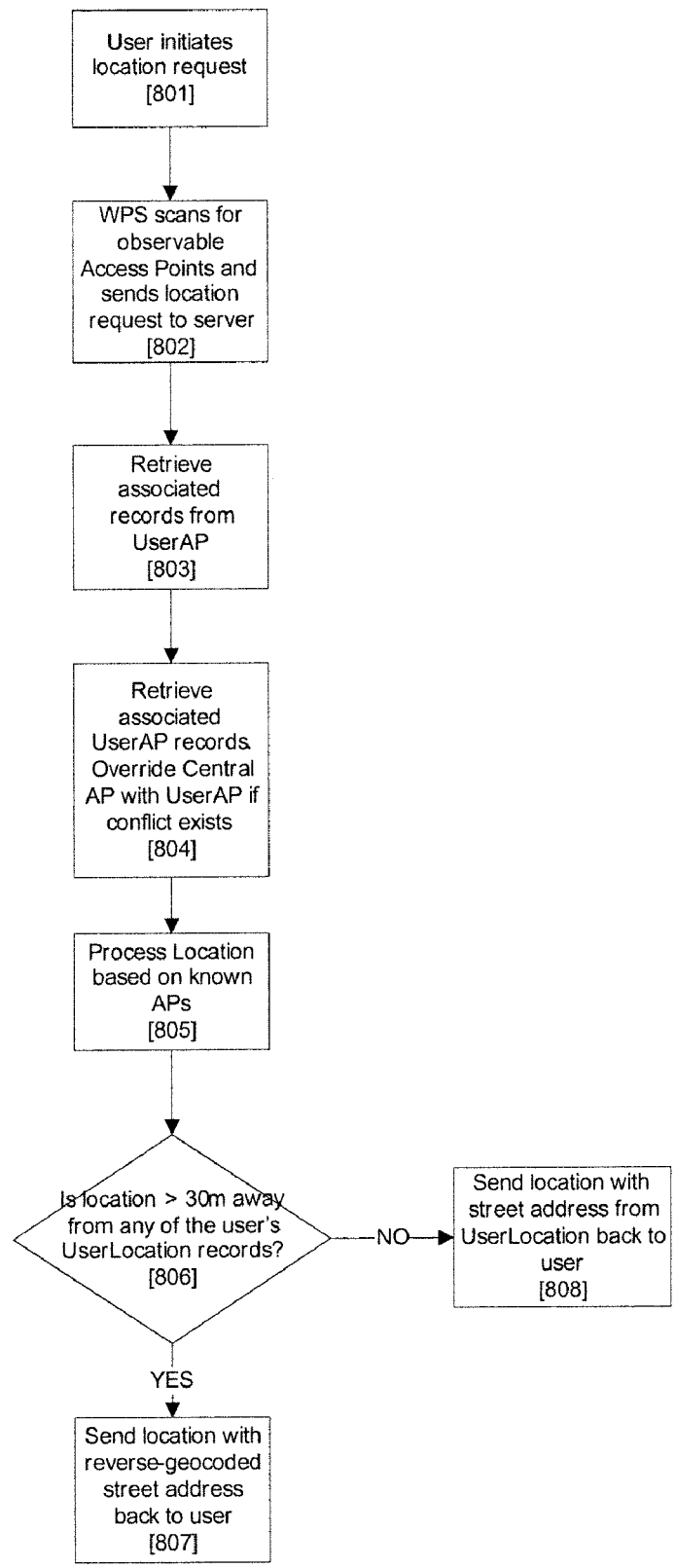
FIG. 8 illustrates the process by which user-tuned location information is utilized during the processing of a location request.

Subsequent location requests, as depicted in FIG. 8, take this new user-submitted location data into account when determining the location of the mobile device. When a user initiates a location request (step 801), the mobile device scans for all access points in range, receives their MAC addresses, and their received signal strengths. This information and the user's unique ID are sent from the mobile device to the server (step 802). The system receives the location request and parses out the individual MAC address readings. The system queries the CentralAP table for records matching the MAC addresses submitted in the location request (step 803). The UserAP table is then queried for records matching the MAC addresses that have been tuned by this user. The results from the UserAP table are then overlaid on top of any results from the CentralAP table (step 804). If a MAC address is found in both the UserAP table and the CentralAP table, the results from the UserAP table override the results from the CentralAP table. The system then determines the mobile devices location based on this data, thereby producing a latitude and longitude location (step 805).

In one implementation, the system performs an optional refinement of the estimated location by comparing the latitude and longitude determined by the system to any user-corrected locations that have been submitted by the particular user. If the user has submitted a user-corrected location that is within a threshold distance from the system determined location (step 806), the system returns the closest user-submitted street address in the result (step 808). This result includes the determined latitude, longitude, and street address as submitted by the user during a previous user-correction request.

However, if the system determined location is greater than the threshold distance from any of the user-corrected locations, the system returns the determined location as the result (step 807) and provides a reverse geocoded address for the location. Reverse geocoding is the process of converting a latitude and longitude reading into an actual street address using street map data. The reverse geocoding technique estimates the spread of address numbers along a street vector and determines which street address number is closest to the determined latitude/longitude position. The threshold distance is selected based on the degree of accuracy desired. For example, a threshold distance of 30 meters can be used.

In another embodiment, the user corrected location and associated data (such as Access Point MAC address, signal strength, and user's IP address) may be used to supplement or correct the location system's master database. In this embodiment, a multi-tiered data structure is employed. For example, first tier data is systematically gathered by the methods described in U.S. patent application Ser. No. 11/261,988, entitled "Location-Based Services that Choose Location Algorithms Based on Number of Detected Access Points Within Range of User Device", incorporated above. Second tier data is gathered automatically by users of the system, such as by the methods described in U.S. patent application Ser. No. 11/359,144, entitled "Continuous Data Optimization of Moved Access Points in Positioning Systems", incorporated above. In this embodiment, the first and second tier data are available for use by all users of the location system.

The user corrected locations and associated data may constitute a third tier of data. Typically, only the particular user that submitted the data would use this third tier data. However, if a sufficient number of users corroborate the third tier data, it may be utilized to generate second tier data, which can then be utilized by all users of the system. As the number of user corrections for a particular access point increases, the system can use the signal strength readings to reverse triangulate a new location for slightly mis-positioned access points.

The system is also capable of locating the user on the basis of the IP address of the user's mobile device. Typically, the system uses a database that correlates known IP addresses with a location associated with each IP address (such databases are commercially available). Thus, if the user's mobile device is not currently operating in a wireless mode, the system can determine the user's location given the mobile device's assigned IP address. As described above, the system also gathers the mobile device's IP address when the user submits a user location correction request. The system stores this IP address and user-submitted location information as correlated records.

Therefore, the user-correction techniques described above can be used with IP addresses in the same way the techniques are used with access points. If a user, operating in a non-wireless environment, has submitted a user corrected location request while using a particular IP address, the system will respond to a future location request with the user-corrected location if the mobile device is using the same correlated IP address.

Likewise, as the UserAP table grows in size due to continued user-corrected submissions, there is enough data to dynamically determine the position of an access point not currently in the CentralAP table. The system can employ a process similar to the one used to generate the CentralAP table, as described in the incorporated applications, can be employed to leverage the user-submitted data for all users of the system. By capturing numerous scan readings from multiple locations surrounding an access point, the system can dynamically determine the access point's location. Since this information takes into account the actual scan information in aggregate, the system protects itself from malicious or inaccurate user-contributed data. Thus, this information can be used in subsequent location requests just like any other data in the CentralAP table for all users, not just the user associated with the user-submitted information. This allows the system to dynamically grow and support users that are not in one of the main coverage areas.

In another implementation of the system, a user would submit a location request to the server as described above. If the MAC addresses of the detected access points submitted in the location request are not in the CentralAP table nor in the UserAP table for the particular user, then the system uses a secondary method for determining location. In accordance with this secondary method, the system queries the entire UserAP table to determine if the detected access points have user-submitted locations submitted by any user. If a match is found, the matching access point locations are used by the standard location algorithm to determine the user's location.

In such a scenario, the user is notified that the location provided is of lower accuracy and is not of the same quality as a result being produced from the CentralAP table. This enables the user or another application to treat the location with lower confidence. While the location result may not be as accurate, this feature allows the coverage database to grow organically to geographical areas that are not presently covered.

It will be appreciated that the scope of the present invention is not limited to the above-described embodiments, but rather is defined by the appended claims, and these claims will encompass modifications of and improvements to what has been described. For example, embodiments have been described as having a client-server architecture. However, embodiments of the invention can be implemented in the user's mobile device, in which the mobile device contains the access point location data and performs all techniques needed to determine the user's location.

What is claimed is:

1. A method of estimating a geographic location of a WLAN-enabled user-device in a WLAN-based positioning system having a plurality of WLAN-enabled access points, the method comprising:
   the WLAN-enabled device receiving signals transmitted by WLAN-enabled access points in range of the WLAN-enabled user-device so that observed WLAN-enabled access points identify themselves;
   accessing a master database that associates WLAN-enabled access points with corresponding geographic locations for the WLAN-enabled access points as determined by an audit of a relatively large geographic area and obtaining geographic location information for any identified WLAN-enabled access point in range of the WLAN-enabled user-device;
   accessing a supplemental database to obtain inferred geographic location information corresponding to any identified WLAN-enabled access point in range of the WLAN-enabled user-device, the supplemental database having a relatively small set of WLAN-enabled access points and corresponding inferred geographic locations, the inferred geographic locations being inferred based on input by a user of the WLAN-based positioning system; and
   estimating a geographic location of the WLAN-enabled user-device based on the geographic location information obtained from the master database and the inferred geographic location information obtained from the supplemental database.

2. The method of claim 1, wherein the supplemental database includes a subset of WLAN-enabled access points of the master database and corresponding inferred geographic locations based on inferring the geographic locations of the WLAN-enabled access points of the subset are incorrect in the master database.

3. The method of claim 1, wherein the supplemental database includes WLAN-enabled access points that were not discovered by the audit of the relatively large geographic area.

4. The method of claim 1, wherein at least one geographic location from the master database and at least one inferred geographic location are for the same WLAN-enabled access point and wherein the inferred geographic location is used in place of the geographic location from the master database when estimating the geographic location of the WLAN-enabled user-device.

5. The method of claim 1, wherein the inferred geographic location information used to estimate the geographic location of the WLAN-enabled user-device is inferred based on input by a single selected user of the WLAN-based positioning system.

6. The method of claim 1, wherein at least one of the master database and the supplemental database resides on the WLAN-enabled user-device.

7. The method of claim 1, wherein at least one of the master database and the supplemental database resides on a server remote from the WLAN-enabled user-device.

8. The method of claim 1, wherein the inferred geographic location is supplied by a user of the WLAN-based positioning system.

9. The method of claim 8, wherein the inferred geographic location is a current location of the WLAN-enabled user-device.

10. The method of claim 8, wherein a WLAN-enabled access point and its inferred geographic location are included in the supplemental database if the difference between the user-supplied geographic location and the geographic location in the master database associated with the WLAN-enabled access point is greater than a threshold distance.

11. The method of claim 10, wherein the threshold distance is based on the average signal propagation distance of more than one WLAN-enabled access points of the WLAN-based positioning system.

12. The method of claim 11, wherein the threshold distance is about 300 meters.

13. The method of claim 1, wherein the input by the user of the WLAN-based positioning system is a street address.

14. The method of claim 1, wherein the input by the user of the WLAN-based positioning system is a latitude and longitude.

15. The method of claim 1, wherein the inferred geographic location is based on input by more than one user of the WLAN-based positioning system.

16. The method of claim 1, further comprising estimating a street address corresponding to the estimated geographic location of the WLAN-enabled user-device.

17. The method of claim 16, wherein estimating the street address is based on a user-supplied street address having a distance from the estimated geographic location of the WLAN-enabled user-device that is less than a threshold distance.

18. The method of claim 17, wherein the threshold distance is about 30 meters.

19. A system for estimating a geographic location of a WLAN-enabled user-device in a WLAN-based positioning system having a plurality of WLAN-enabled access points, the system comprising:
  a WLAN-enabled device for receiving signals transmitted by WLAN-enabled access points in range of the WLAN-enabled user-device so that observed WLAN-enabled access points identify themselves;
  a first logic for accessing a master database that associates WLAN-enabled access points with corresponding geographic locations for the WLAN-enabled access points as determined by an audit of a relatively large geographic area and obtaining geographic location information for any identified WLAN-enabled access point in range of the WLAN-enabled user-device;
  a second logic for accessing a supplemental database to obtain inferred geographic location information corresponding to any identified WLAN-enabled access point in range of the WLAN-enabled user-device, the supplemental database having a relatively small set of WLAN-enabled access points and corresponding inferred geographic locations, the inferred geographic locations being inferred based on input by a user of the WLAN-based positioning system; and
  a third logic for estimating a geographic location of the WLAN-enabled user-device based on the geographic location information obtained from the master database and the inferred geographic location information obtained from the supplemental database.

20. The system of claim 19, wherein the supplemental database includes a subset of WLAN-enabled access points of the master database and corresponding inferred geographic locations based on inferring the geographic locations of the WLAN-enabled access points of the subset are incorrect in the master database.

21. The system of claim 19, wherein the supplemental database includes WLAN-enabled access points that were not discovered by the audit of the relatively large geographic area.

22. The system of claim 19, wherein at least one geographic location from the master database and at least one inferred geographic location are for the same WLAN-enabled access point and wherein the inferred geographic location is used in place of the geographic location from the master database when estimating the geographic location of the WLAN-enabled user-device.

23. The system of claim 19, wherein the inferred geographic location information used to estimate the geographic location of the WLAN-enabled user-device is inferred based on input by a single selected user of the WLAN-based positioning system.

24. The system of claim 19, wherein at least one of the master database and the supplemental database resides on the WLAN-enabled user-device.

25. The system of claim 19, wherein at least one of the master database and the supplemental database resides on a server remote from the WLAN-enabled user-device.

26. The system of claim 19, wherein the inferred geographic location is supplied by a user of the WLAN-based positioning system.

27. The system of claim 26, wherein the inferred geographic location is a current location of the WLAN-enabled user-device.

28. The system of claim 26, wherein a WLAN-enabled access point and its inferred geographic location are included in the supplemental database if the difference between the user-supplied geographic location and the geographic location in the master database associated with the WLAN-enabled access point is greater than a threshold distance.

29. The system of claim 28, wherein the threshold distance is based on the average signal propagation distance of more than one WLAN-enabled access points of the WLAN-based positioning system.

30. The system of claim 29, wherein the threshold distance is about 300 meters.

31. The system of claim 19, wherein the input by the user of the WLAN-based positioning system is a street address.

32. The system of claim 19, wherein the input by the user of the WLAN-based positioning system is a latitude and longitude.

33. The system of claim 19, wherein the inferred geographic location is based on input by more than one user of the WLAN-based positioning system.

34. The system of claim 19, further comprising a fourth logic for estimating a street address corresponding to the estimated geographic location of the WLAN-enabled user-device.

35. The system of claim 34, wherein estimating the street address is based on a user-supplied street address having a distance from the estimated geographic location of the WLAN-enabled user-device that is less than a threshold distance.

36. The system of claim 35, wherein the threshold distance is about 30 meters.

* * * * *